United States Patent [19]

Ludwig

[11] 4,363,309
[45] Dec. 14, 1982

[54] VALVE, PARTICULARLY CROSSOVER PASSAGE VALVE

[75] Inventor: George C. Ludwig, Florence, S.C.

[73] Assignee: AVM Corporation, Jamestown, N.Y.

[21] Appl. No.: 176,758

[22] Filed: Aug. 11, 1980

[51] Int. Cl.³ .............................................. F16K 1/22
[52] U.S. Cl. .................................. 123/552; 251/305; 123/190 D
[58] Field of Search ............... 123/552, 190 D, 190 E, 123/190 DA; 251/305, 309, 214, 368; 173/568

[56] References Cited

U.S. PATENT DOCUMENTS

| | | | |
|---|---|---|---|
| 1,853,623 | 4/1932 | Kirby | 123/552 |
| 1,911,787 | 5/1933 | Bartz | 123/552 |
| 2,718,665 | 9/1955 | Clade | 251/309 |
| 2,862,685 | 12/1958 | Lundberg | 251/305 |
| 3,693,935 | 9/1972 | Thauer | 251/305 |
| 3,717,130 | 2/1973 | Thornburgh | 123/568 |
| 4,006,881 | 2/1977 | Gaillard | 251/368 X |
| 4,020,808 | 5/1977 | Yagi et al. | 123/568 |
| 4,196,744 | 4/1980 | Bradshaw | 123/568 X |
| 4,198,030 | 4/1980 | Jackson et al. | 123/568 |

FOREIGN PATENT DOCUMENTS 1139182 1/1969 United Kingdom ............... 251/305

Primary Examiner—Wendell E. Burns
Attorney, Agent, or Firm—Le Blanc, Nolan, Shur & Nies

[57] ABSTRACT

A sealed butterfly-type valve for an exhaust gas passage in an engine intake mainfold, the valve having a rotatably mounted stem carrying a gas flow modifying valve element disposed in the passage, and sealing against escape of exhaust gases along the stem is prevented by axially biasing the stem to urge an annular axial sealing face on the stem into engagement with an annular high temperature resistant bearing element of compressed graphite or the like surrounding the stem on the passage wall.

11 Claims, 12 Drawing Figures

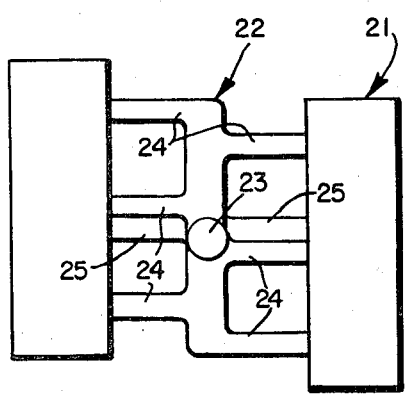
Fig.1
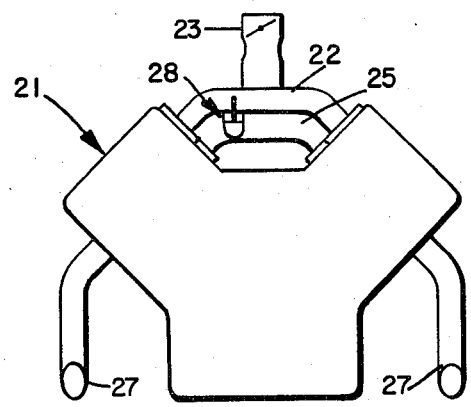
Fig.2
Fig.3
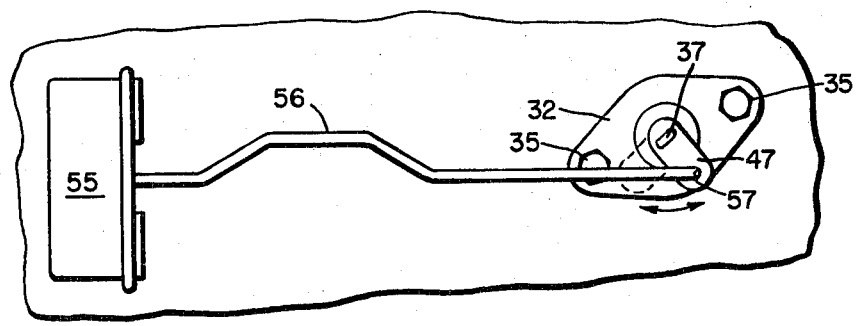
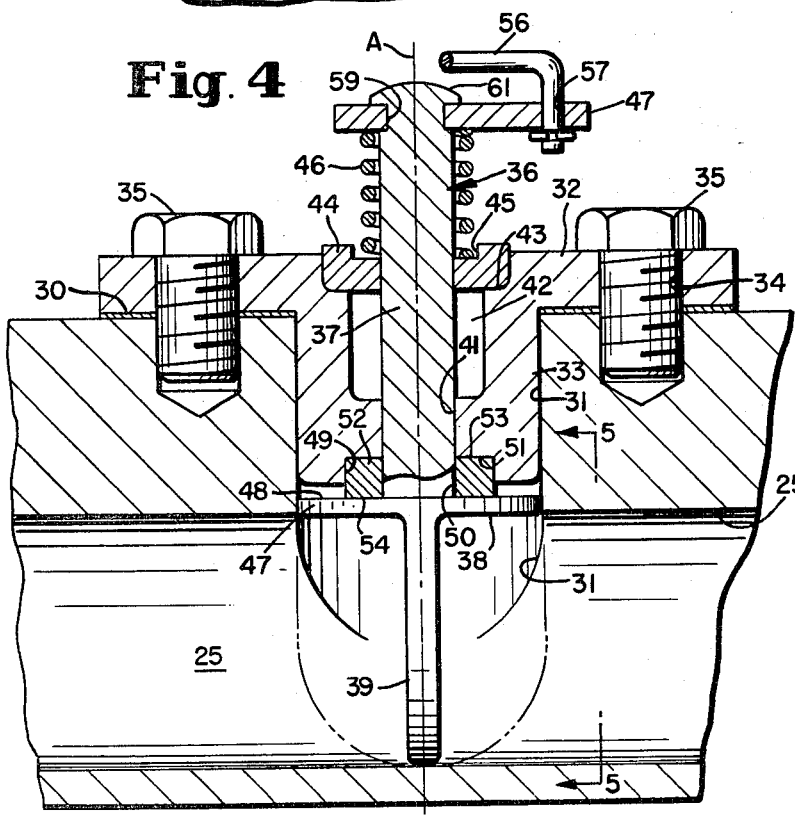
Fig.4
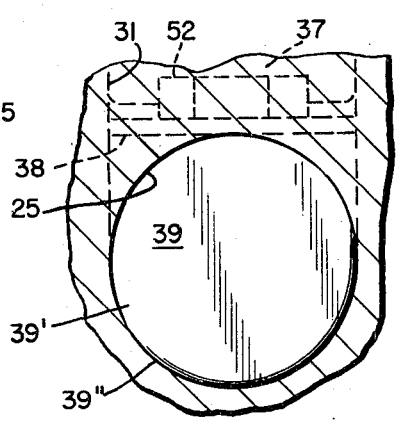
Fig.5

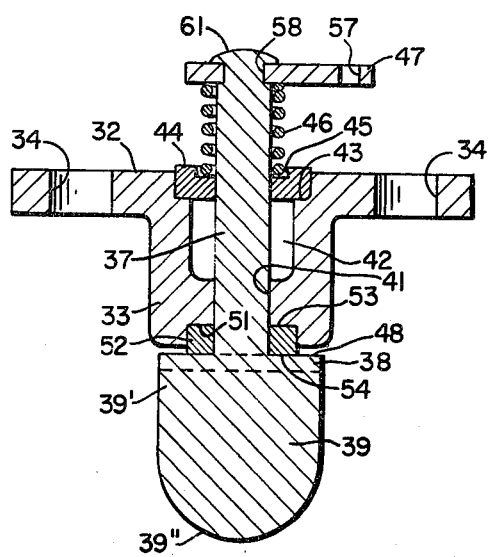
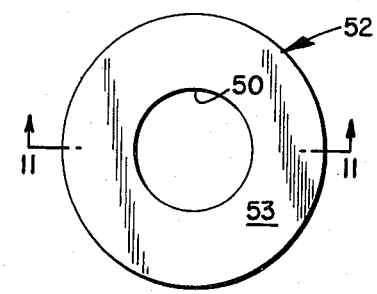
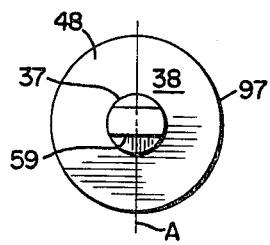
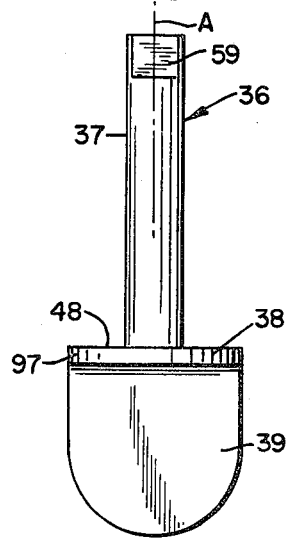
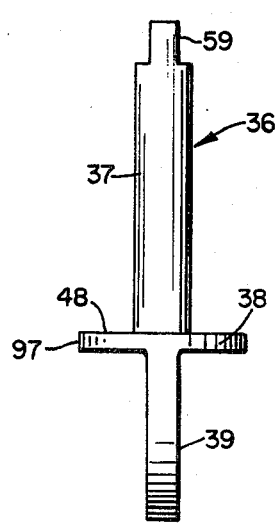
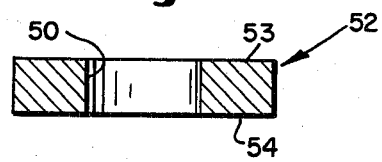
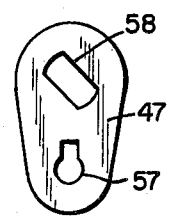

VALVE, PARTICULARLY CROSSOVER PASSAGE VALVE

This invention relates to valves and particularly to valves with movable elements having gas tight mountings for modifying gas flow in such passages as exhaust gas crossover passages in intake manifolds of internal combustion engines.

It has become more or less standard to provide internal combustion engines, especially for automobiles, with exhaust gas recirculation passages whereby exhaust gas is returned to join the incoming fuel so that noxious gases such as nitrous oxide are prevented from forming.

In order to eliminate external tubing and excess structural formations it has become the practice to cast the exhaust gas recirculation (EGR) passage in the intake manifold unit and to provide a control valve in that passage. For example U.S. Pat. No. 3,717,130 issued to Thornburgh Feb. 20, 1973 discloses a cast intake manifold containing an internal exhaust gas recirculation passage that conveys exhaust gas to the fuel induction passages. A butterfly type valve is disposed in the EGR passage and this valve is controlled by operational engine conditions. Other types of EGR passage valves for the purpose are disclosed in the U.S. Pat. to Kern et al Nos. 4,202,808 issued May 3, 1977; Bradshaw 4,196,744 issued Apr. 8, 1980 and Jackson et al 4,198,030 issued Apr. 15, 1980.

In addition it has become common to cast into the intake manifold a so-called exhaust gas crossover passage whereby some hot exhaust gases are conveyed to heat the entering fuel mixture by heating the metal of the manifold at the induction passages. The above-identified Thornburgh patent discloses such a built-in exhaust gas crossover passage leading from the exhaust around the induction passages and eventually joining the EGR passage.

In various engines the exhaust gas crossover passage may exhibit various forms and locations in the intake manifold, and the foregoing reference to the particular intake manifold of the Thornburgh patent is only for the purpose of identification and explaining utility of the invention.

The invention in its preferred embodiment comprises a sealed control valve assembly for the exhaust gas crossover passage in an intake manifold and the provision of such is a major object of the invention.

A further major object of the invention is to provide a butterfly type valve that has a rotary stem mounted in a manifold or like passage wall, the mounting being such that escape of exhaust gas along the stem is effectively eliminated and it is the major object of this invention to provide novel leak-proof valve stem mounting for an exhaust gas flow passage control valve.

The mounting of a rotary stem valve to control gas passage in a complex metal structure such as an intake manifold that is subjected to high changing temperatures inducing random and unpredictable stresses in gas passage walls presents difficult problems in sealing against the escape of gases along the stem. Moreover, the bearing seal of rotary valve stems has been adversely affected by particles precipitated from the hot exhaust gases and entering the space between the valve stem and the surrounding bore, thereby creating binding and leakage problems. It has been proposed to mount butterfly type valves for hot exhaust gas passages on steel bushings but leakage problems remain. It is a major object of the present invention to provide a rotary valve arrangement solving such problems.

An important object of the invention is to provide a novel sealed mounting arrangement for a rotary butterfly type valve stem wherein a special radial seal incorporates a smooth graphite-metal interface.

A further object of the invention is a novel sealed mounting arrangement for a rotary valve stem wherein the valve stem is surrounded by an annulus of compressed graphite or like high temperature resistant bearing material and the stem is resiliently biased to contain that annulus gas tight between an annular smooth metal face on the stem and a parallel annular metal face disposed on a wall of a passage into which the stem projects.

It is an important object of the invention to provide as a subassembly a novel combination butterfly-type valve and sealed mounting therefor adapted for ready installation on an intake manifold or the like having an exhaust gas passage to be controlled by the valve.

Further novel features and other objects of this invention will become apparent from the following detailed description discussion and the appended claims taken in conjunction with the accompanying drawings.

BRIEF DESCRIPTION OF DRAWINGS

FIG. 1 is a schematic top plan view showing location of the crossover passage valve of the invention in a typical embodiment;

FIG. 2 is a schematic elevational view of the arrangement of FIG. 1;

FIG. 3 is a fragmentary top plan view showing the valve mounted on the intake manifold and connected to its actuating motor;

FIG. 4 is an enlarged fragmentary view mainly in section showing the valve mounted on the intake manifold;

FIG. 5 is a fragmentary section substantially on line 5—5 of FIG. 4 showing valve and passage detail;

FIG. 6 is a sectional view showing the unitary preassembled valve, mounting cover and lever unit as a subassembly ready for installation;

FIG. 7 is a top plan view of the rotary valve element;

FIGS. 8 and 9 are 90° apart side elevational views of the rotary valve element of FIG. 7;

FIGS. 10 and 11 are plan and diametrical sectional views respectively of the compressed graphite seal element; and FIG. 12 is a side view of the valve actuating lever.

PREFERRED EMBODIMENTS

FIGS. 1 and 2 illustrate the preferred environment of the valve of the invention, here a V-6 automobile engine 21 that includes a one-piece cast aluminum intake manifold assembly 22 suitably mounted on the engine and having a carburetor connection 23 and six gas inlet passages 24 leading to the respective cylinders.

The intake manifold assembly 22 includes a conventional type internally cast exhaust crossover passage indicated at 25, the purpose of which as known is to convey hot exhaust gases through the metal manifold to raise the manifold temperature for preheating and heating the incoming fuel mixture. The engine has conventional exhaust passages 27 leading to the muffler.

The invention here as described comprises a special butterfly type valve assembly indicated at 28 for controlling flow of gas in the exhaust gas crossover passage.

Referring now to FIGS. 3-5, the intake manifold is formed with a cylindrical bore 31 the axis of which intersects the axis of cylindrical crossover valve passage 25 at right angles. The valve assembly includes a cover 32 for bore 31 having a cylindrical boss 33 centered with and slidably fitted into bore 31. Cover 32 is thus effectively a removable part of the wall of passage 25. Opposite sides of the cover 32 are formed with bolt holes 34 through which extend bolts 35 for detachably mounting the valve assembly on the intake manifold. A suitable seal gasket 30 is clamped between the cover and the intake manifold so that there is no escape of hot gas along bore 31. Boss 33 terminates short of the passage 25 as shown.

The rotary valve element 36, shown also in FIGS. 7-9, is an intergral corrosion resistant preferably stainless steel element having a cylindrical stem 37, a sealing flange 38 and a gas flow modifying element in the form of a passage closure plate 39 centered with stem 37. Stem 37 is rotatable within a cylindrical bore 41 in cover boss 33 concentric with bore 31. At its outer side the cover 32 is formed with a well 42 the open end of which is surrounded by an enlarged recess providing annular ledge 43. An annular rigid washer 44 is seated on ledge 43 and surrounds valve stem 37 to provide a bearing support coaxial with bore 41.

Washer 44 is formed with an external annular recess 45 surrounding the valve stem where it passes through the washer. Seated at one end in recess 45 is a coiled compression spring 46 that extends freely along the stem into contact at its other end with an actuating lever 47 rigid with stem 37. Washer 44 thus serves as a fixed abutment rigid with the cover 32, and spring 46 axially resiliently biases the valve element 36 outwardly relative to the cover 32.

At the juncture of valve stem 37 and closure plate 39, sealing flange 38 comprises an integral enlargement of the stem having a circular periphery 97 that fits closely slidably in bore 31 and may be disposed in bore 31 just above its intersection with passage 25. The annular radially extending surface 48 of flange 38 is smooth and flat and extends accurately at right angles to the axis of valve stem 37.

At its inner end cover, boss 33 is formed with an annular cylindrical recess 49 providing a flat ledge 51 surrounding and perpendicular to the valve stem 37, and seated in that recess 49 is an annular seal element 52 which is coaxial with stem 37 and projects axially out of the recess toward flange 38 as shown. Seal element 52 is essentially a solid hollow cylinder having one smooth end face 53 seated flush on ledge 51 and an opposite parallel smooth end face 54 in flush engagement with flange surface 48. Centrally element 52 has a smooth cylindrical bore 50 sized to loosely slidably and rotatably accept the valve stem. In the assembly the resilient bias exerted by spring 46 urges the flange 38 tightly sealingly against seal element 52 which in turn is tightly urged against ledge 51. The above-mentioned Bradshaw patent discloses a Grafoil seal for the reciprocable valve stem of an EGR passage valve, but not for a rotary seal.

Valve element 36 may be rotated about its axis A by means of a vacuum motor 55 (FIG. 3) having an internal diaphragm or piston (not shown) connected to one end of a reciprocable link 56 that is pivotally connected at its other end at 57 to actuating lever 47. Actuating lever 47 (see FIG. 12) is formed with a non-circular slot 58 that fits over the non-circular outer end 59 of the valve stem which is than peened over at 61 whereby lever 47 is fixed axially and angularly on the valve stem.

Operation of motor 55 is effected, in response to signals derived from engine operation, to rock the valve stem through 90° between a crossover passage closed condition shown in full lines in FIGS. 4 and 5 to block flow of exhaust gas, and a crossover passage open condition shown in dotted lines in FIG. 4. The smooth bearing fit of surfaces 48 and 54 offers little or no opposition to valve rotation while maintaining the seal intact.

The seal element 52 is preferably composed of compressed graphite or an equivalent hard highly heat resistant bearing composition that will not change its physical characteristics and dimensions when exposed to hot gases such as encountered in the exhaust system of an internal combustion engine. A successful seal element has been composed of the graphitic material sold under the trade name GRAFOIL by Union Carbide Company. The opposite end surfaces 53 and 54 are accurately perpendicular to the axis of bore 50. During operation of the valve as the valve stem rocks about its axis the flat smooth surfaces 48 and 54 relatively move in flush rubbing contact while being urged together by spring 46 and the resultant wear mainly in surface 54 increases the effective sealing action, and there is no leak of hot gases outwardly along the valve stem. The surface 54 becomes polished with increasing use and increasingly more effective. The static seal at surfaces 53 and 51 is augmented by the action of spring 46.

A material advantage of the invention is that the valve assembly may be completely preassembled properly on the cover 32 prior to mounting on the manifold. This presently is shown in FIG. 6. The spring 46 urges the sealing surfaces 48 and 54 axially together and the actuating lever 47 is accurately angularly related to the plane of closure plate 39. The surfaces 48 and 54 can be worked together in the factory to ensure good flush sealing engagement. For installation all that is necessary is to form bore 31 and the tapped holes for bolts 35, and the preassembled unit of FIG. 6 can be installed in a very short time. This of course can be done in existing engines already having exhaust crossover passages in the intake manifold as well as in new engines.

As is clear from FIGS. 4-6, the flat sided valve closure plate 39 is effectively of the butterfly valve type, and it comprises a generally rectangular portion 39' adjacent flange 38 and a semicylindrical portion 39'' at the end. This shape ensures that the closure plate will extend entirely across the effective passage opening at its juncture with bore 31.

While the foregoing valve is disclosed as mounted to control the exhaust gas crossover passage, the invention can be used in other environments, for example for mounting a butterfly valve such as that of the Thornburgh patent in the EGR passage.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured in Letters Patent is:

1. In a metal engine manifold unit having an exhaust gas passage, the provision of a butterfly-type valve having a stem rotatably mounted in the unit and carrying a gas flow modifying valve element disposed in said passage, and means for sealing against escape of exhaust gases along said stem comprising: means including a stem boss mounting said valve element on said unit; an annulus of a combined sealing and bearing material with a cylindrical hole and a flat radial annular face mounted on the end of said boss in surrounding radial bearing relationship to said stem; said stem including a portion with an enlarged flat radial annular face; said mounting means including means resiliently urging said stem portion against said annulus with the two flat radial annular faces in axial bearing engagement; said annulus being an integral annulus of compressed graphite providing heat resistant sealing at said bearing engagements.

2. In the manifold unit defined in claim 1, said passage being cylindrical and there being a bore intersecting said passage, said means mounting said valve on said unit is removable and comprises a cover for said bore having said boss projecting into said bore, said stem being rotatably mounted in said boss and projecting through said cover and said resilient urging of said faces together being accomplished by spring means compressed between said cover and an end of said stem that projects through said cover.

3. In the manifold unit defined in claim 2, said bore being cylindrical and intersecting said passage at right angles, and said valve element being shaped correspondingly to said intersection.

4. The manifold unit defined in claim 1, wherein said passage is an exhaust gas crossover passage in said unit.

5. A leak resistant valve assembly in combination with means defining a flow passage for hot gases, a rotary valve stem extending through a wall of the passage for mounting a flow modifying valve element within the passage, a sealing annulus of heat resistant compressed graphite bearing material surrounding the stem, said annulus being axially fixed relative to the passage wall and having a flat axial sealing and bearing face, an enlarged stem portion having a flat axial face smoothly engaging said axial face of the sealing annulus, means on said stem externally of said passage for controllably turning the stem about its axis, and resilient means axially biasing said stem outwardly relative to said passage whereby to maintain continuous gas tight contact between said faces on the sealing annulus and said stem.

6. The valve assembly defined in claim 5, wherein said sealing faces engage in a plane perpendicular to the axis of rotation of said stem.

7. The valve assembly defined in claim 5, wherein said stem is of corrosion resistant metal and the sealing face thereon is on a radial flange integral with said stem.

8. The valve assembly defined in claim 5, wherein said passage wall has an annular recess surrounding the valve stem, said recess having a flat bottom surface perpendicular to the axis of said stem, said bearing annulus being a parallel sided integral element of compressed graphite having one flat side surface flush with said recess bottom surface and a parallel flat side surface serving as the sealing face that engages the sealing face on said enlarged portion of the stem, and said resilient means biasing said bearing annulus into said recess whereby a gas tight seal is provided at both parallel sides of said bearing annulus.

9. The valve assembly defined in claim 5, wherein said passage is an exhaust gas passage in an intake manifold unit.

10. A subassembly comprising a mounting support, a valve stem rotatably mounted in said support and having opposite ends projecting from said support, a passage closure valve portion on one of said ends of the stem, means including a sealing and bearing annulus providing axially engaged smooth relatively rotatable sealing surfaces on said stem and said support, and means at the other end of said stem for resiliently biasing said stem to maintain said surfaces in contact; said support comprising a boss surrounding the valve stem and having an annular smooth end face on which is seated said sealing and bearing annulus formed with one of said sealing surfaces; said boss being cylindrical and said annular smooth face therein being formed in a recess surrounding the stem, said sealing and bearing annulus being a parallel sided element of compressed graphite or equivalent hard bearing material that is resistant to change upon exposure to high temperatures in the order of those encountered in internal combustion engine exhaust gas passages, and the sealing surface on said valve stem being formed on a radial flange integral with the stem.

11. In the subassembly defined in claim 10, an actuating lever fixed axially and angularly on said other end of the stem, and said biasing means being a compression spring surrounding the stem extending between said support and the lever.

* * * * *